April 6, 1943.  R. W. DAVIDSON  2,315,689
TYPEWRITING MACHINE
Filed Dec. 13, 1940   3 Sheets-Sheet 1
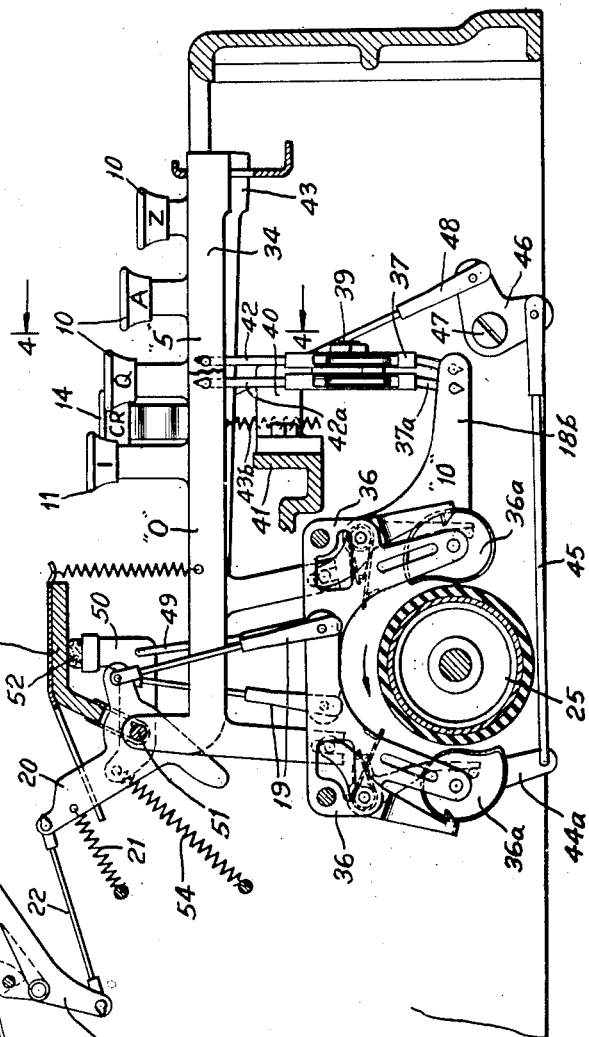
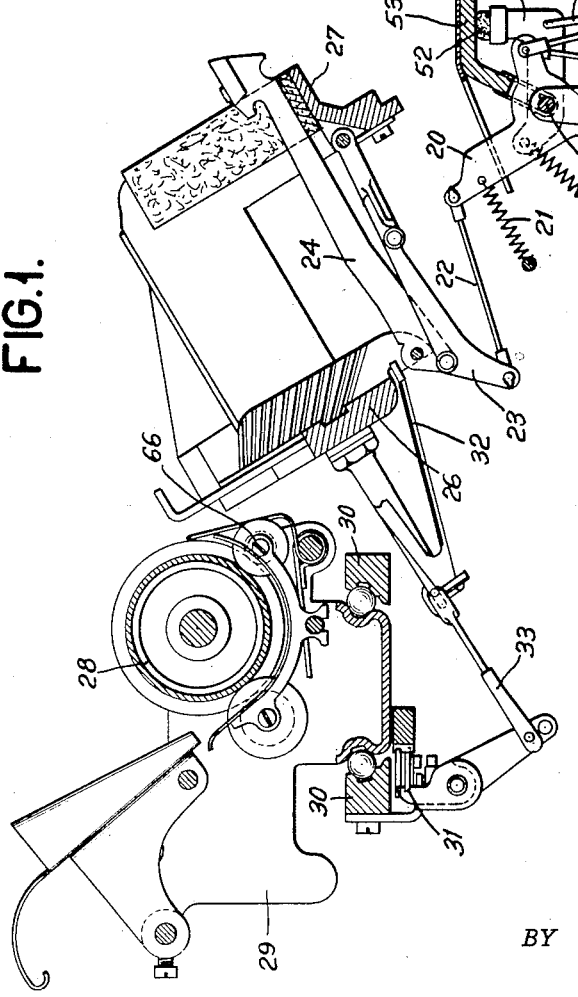
INVENTOR
Richard W. Davidson
BY
W. M. Wilson
ATTORNEY April 6, 1943.  R. W. DAVIDSON  2,315,689
TYPEWRITING MACHINE
Filed Dec. 13, 1940  3 Sheets-Sheet 2

INVENTOR
Richard W. Davidson
BY
ATTORNEY

April 6, 1943. R. W. DAVIDSON 2,315,689
TYPEWRITING MACHINE
Filed Dec. 13, 1940 3 Sheets-Sheet 3

INVENTOR
Richard W. Davidson
BY
W. M. Wilson
ATTORNEY

Patented Apr. 6, 1943

2,315,689

UNITED STATES PATENT OFFICE 2,315,689

TYPEWRITING MACHINE

Richard W. Davidson, West Englewood, N. J., assignor to International Business Machines Corporation, New York, N. Y., a corporation of New York Application December 13, 1940, Serial No. 369,991

30 Claims. (Cl. 197—17)

This invention relates to typewriting machines.

The principal object of the present invention is to provide a machine for effectively typing upon small bills which contain a large number of items involving mostly amounts of a relatively fixed value which occur frequently, such as the sums 10, 15, 20, and 25 cents.

An object is to provide a machine in which, by a single key depression, a plurality of characters may be printed in succession.

An object is to provide a machine in which a succession of machine operations involving the successive printing of several characters may be effected by a single key depression.

An object is to provide mechanism for enabling multidigit amounts to be printed as a result of the depression of a single key.

An object is to provide an automatic means of returning the carriage upon the printing of a multidigit amount or group of characters.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a vertical section of the keyboard, power mechanism, and typebar action of a typewriting machine embodying the present invention.

Fig. 6 is a specimen of a bill which the present invention is designed to write.

Figure 2:
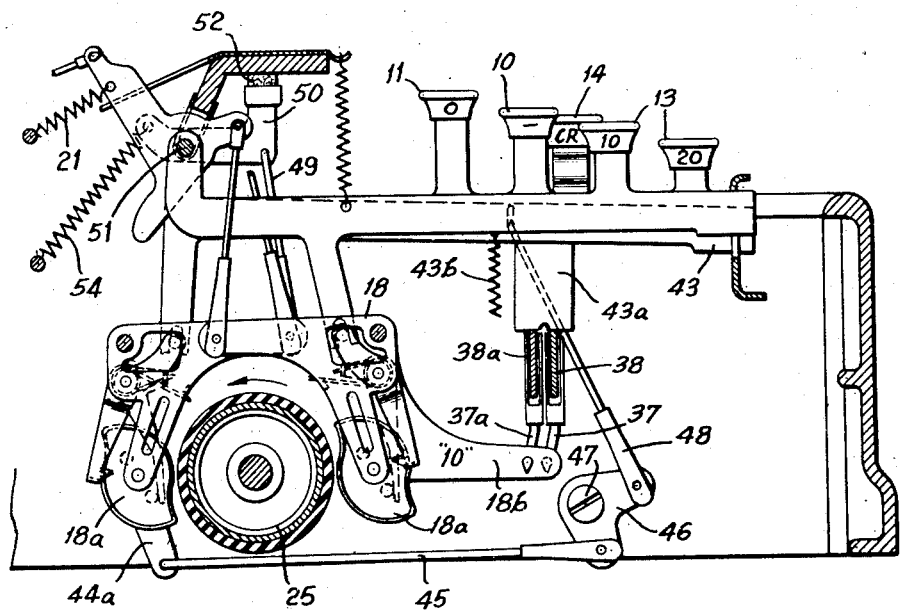
Fig. 2 is a vertical section of the keyboard showing certain parts which appear behind others in Fig. 1.

There are certain classes of business in which it is necessary to furnish itemized bills or lists of charges comprising mainly many items in amounts such as 10, 15, 20, and 25 cents. Usually each bill in the aggregate does not involve a very large sum, whereby the overhead cost per bill for writing many small bills is a relatively large sum as compared with the average total of a bill.

A typical case is of the telephone business, in which subscribers must be furnished with itemized lists of service charges, such as toll calls, and the sending of telegrams, messenger service, and other services which are often furnished by telephone and telegraph companies and which involve many small charges. Usually such an itemized list is furnished with each monthly bill to enable the subscriber to verify the legitimacy of the charges. It is the experience of most telephone companies that the bulk of the subscribers do not make many long distance calls but do frequently call subscribers in adjoining districts, in which case the charges for these calls are between 10 and 50 cents, most of the items being in the fixed amounts of 10, 15, 20, and 25 cents. On the long distance calls over 50 cents there is usually a tax charge which usually amounts to 10, 15, and 20 cents in accordance with a sliding tax scale on which the charge is figured. The result is that the writing of these bills requires the writing of these fixed small sums a very large number of times, particularly in suburban areas where most subscribers have many acquaintances in adjoining districts or towns, whereby a very large number of their calls are for the amounts of 10, 15, 20, and 25 cents.

Heretofore, the writing of these bills has been done on ordinary typewriters which for convenience may be termed standard office machines, equipped with a twelve inch carriage. This is very tiresome, because a single bill may run to 15 or 20 items no greater than 25 cents, most of them being 10 and 15 cents. Naturally each character printed requires a separate key operation. When it is considered that in large suburban areas, there are telephones in almost every residence, it will be appreciated that very great numbers of these small bills must be written, and the cost of writing them is a considerable item of expense requiring a large staff of employees. Thus any saving of time that can be realized in the writing of these bills is reflected as a large annual saving in the overhead of the billing office.

In Fig. 6 there is shown a typical statement used by a telephone company for the purpose of listing the charges of individual subscribers. It will be noticed that more than two-thirds of the amounts typed in the amount column are 25 cents or less, and that, in the tax column, there is one 10 cent item. It will also be noticed that in practically every case where there is an item falling between the amounts 10 and 25 cents, a carriage return operation is involved, whereby at least three key depressions is required to write the item and condition of the machine for writing the next item. It will be appreciated that a saving in time of more than 50% could be saved in writing the bill shown in Fig. 6 if all of the amounts in the 10 cent to 25 cent group could be written by a single key depression and further gains in efficiency may be expected due to reduced fatigue and a reduction of two-thirds in the amount of attention required of the operator in writing a single item. Also the cost of correcting mistakes in writing the second digit may be reduced since there are twice as many chances of error in writing two digits with two key depressions as with using a single key for both.

The invention as shown is applied to the well known "Electromatic" typewriter which is provided with power mechanism for operating the typebars and other devices and mechanisms of the typewriter. It will be understood, however, that with suitable modifications the invention may be applied to other forms of typewriting machines without departing from the broad principles disclosed hereinafter. It will be understood therefore, that the showing of the invention in conjunction with this machine is purely illustrative.

The machine is provided with a keyboard (Figs. 1, 2, and 3) which comprises the letter and punctuation keys 10, the standard numeral keys 11 disposed in a row at the top of the keyboard, a special character key 12 (Fig. 3), and four special amount keys 13, besides the usual carriage return key 14, the back space key 15, and the tabular key 16. The keyboard is also provided with a space bar 17. The arrangement of the letter keys 10, the numeral keys 11, and the functional keys 14, 15, and 16, follows standard practice. The key 12 bears the cap designation PN, signifying person to person calls. The special amount keys 13, represent the amounts 10, 15, 20 and 25 cents, respectively, and, when depressed, set in motion mechanism which causes a succession of typebars to operate and a carriage return operation to take place, as will be made clear hereinafter.

Figure 3:
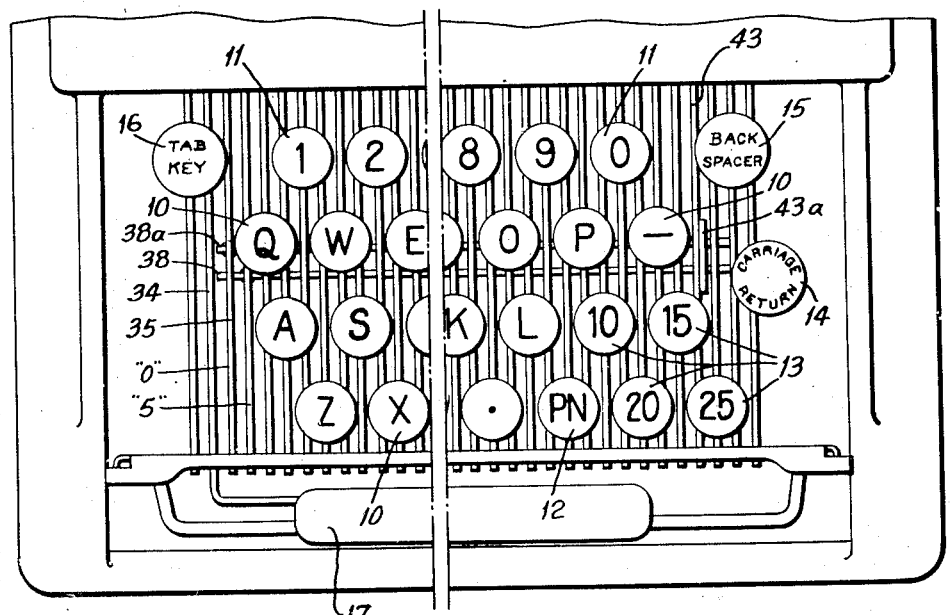
Fig. 3 is a plan view, partly broken away, of the keyboard.

All of the keys 10 to 13 inclusive, control double lobe printing cam units generally designated 18 in Fig. 2 of well known form which are connected by links 19 (Fig. 1) to sublevers 20 restored by springs 21. The sublevers 20 are connected by links 22 to toggles 23 which in turn are connected to typebars like 24. In the present case, only upper case characters are provided on the typebars and no shift mechanism is used. However, two cases and a shift mechanism may be used, if desired, as it will not interfere with operation of the mechanism to be described hereinafter.

The printing cam units 18, in accordance with common practice, are provided with cams 18a which have double lobes, whereby one-half revolution of any cam by power roller 25 in a well known way results in operation of the typebar 24 to which the cam unit is connected. The roller 25 rotates in the direction of the arrows in Figs. 1 and 2, and the depression of any of the printing ways 10 to 13 inclusive, with each of which is associated a typebar 24, results in the operative engagement of the associated cam 18a with the power roller 25 and the operation of the coresponding typebar in a well known way. For a more detailed description of the operation of the typebars by the cam units, reference may be had to Patent No. 1,777,055.

The typebars 24 are pivotally mounted on the usual wire segment 26 which forms part of the type basket 27. In the present case, since no shift mechanism is used, the basket is secured against movement relative to the main frame. The typebars are swung in an arc of 90° when operated to effect an impression upon a work sheet extending around the usual platen 28 mounted in carriage 29. The carriage is mounted on the rails 30 in a well known way and is moved by suitable escapement mechanism 31 operated by the universal bar 32 through a link 33 whenever the typebars are operated. The segment 26 is provided with an annular slot in the back which allows the bar 32 to project far enough to be engaged by the typebars when they are close to the printing point.

The type elements on the typebars 24 associated with the keys 13 print only the first numerals of the numbers designated thereon. In other words, the "10" key 13 and the "15" key both control typebars 24 which print the numeral "1," while the "20" and "25" keys 13 control typebars which print the numeral "2."

The 10, 15, 20, and 25 cent keys 13 control mechanism which causes two additional typebars to be rendered operative when these keys are depressed to print the remaining digit of the numbers designated on the keys. In other words the "10" and "20" keys 13 not only cause the numerals 1 and 2, respectively, to be printed by the type bars directly associated with said keys 13 but also, through other connections to be described, cause an additional "0" typebar to be operated. Similarly, the "15" and "25" keys cause an additional typebar to be operated which prints "5." Thus two typebars are operated whenever one of the 10, 15, 20, and 25 cent keys 13 is depressed.

For the purpose of effecting this result there are provided two additional key levers designated 34, 35 in Figs. 1, 3, 4, and 5. The cam units associated with the key levers 34 and 35 are generally designated 36 in Fig. 1, and these cam units are provided with single lobe cams 36a, for the purpose of providing a delayed action between the cam units 18 associated with the amount keys 13 and the cam units 36 associated with the key levers 34 and 35. Each of the cam units 18 associated with the amount keys 13 is provided with an arm 18b whereby these units not only operate the typebars 24 associated therewith, but also operate a lever system which effects the depression of one or the other of the key levers 34 and 35. The 15 and 25 cent cam units have their arms 18b connected by links 37 (Figs. 4 and 5) to a lever 38 pivoted on a stud 39 on a bracket 40 secured to the frame work 41 which supports the cam units 18 and 36. The other end of the lever 38 is connected by a link 42 to the "5" key lever 35. Similarly, the cam units 18 for the 10 and 20 cent keys 13 are connected by links 37a to a lever 38a actuating the "0" key lever 34 through a link 42a. The lever 38a is pivotally mounted on stud 39.

Whenever one of the amount keys 13 is operated, for example the 10 cent key 13, the cam unit 18 associated with such unit is rocked in a counterclockwise direction (Fig. 2), thereby raising the right hand end (Figs. 4 and 5) of the lever 38a, thereby, through link 42a, drawing down the "0" key lever 34. The cams 18a, 36a are not usually fully released until the associated key has reached almost the limit of its downward stroke. Consequently, the typebar 24 associated with the 10 cent key lever 13 will be almost at the printing point before the cam unit 36 associated with the key lever 34 is actually released. This cam unit will not operate the special zero typebar, however, until the cam 36a associated with such unit has turned approximately 180° thereby allowing time for the "1" typebar operated by the cam unit 18 to be fully restored. Thus the typebars which are controlled by the "10" key operate in succession and the "1" is printed first. The spacing mechanism will operate after the "1" is printed and is another reason for providing a delayed action between the "1" and "0" typebars 24 controlled by the 10 cent key 13. The spacing mechanism will also operate after the "0" typebar has effected its impression.

In a similar fashion, the 15, 20, and 25 cent keys 13 cause the numerals 1 and 5, 2 and 0, and 2 and 5, respectively, to be operated in succession when these keys are depressed. Thus the amounts 10, 15, 20, and 25 are each written as a result of a single key depression. Owing to the great speed of which the power mechanism is capable, there is relatively little time lost between the two typebar operations, with the result that for practical purposes the operation of the two typebars is almost simultaneous.

Figures 4, 5:
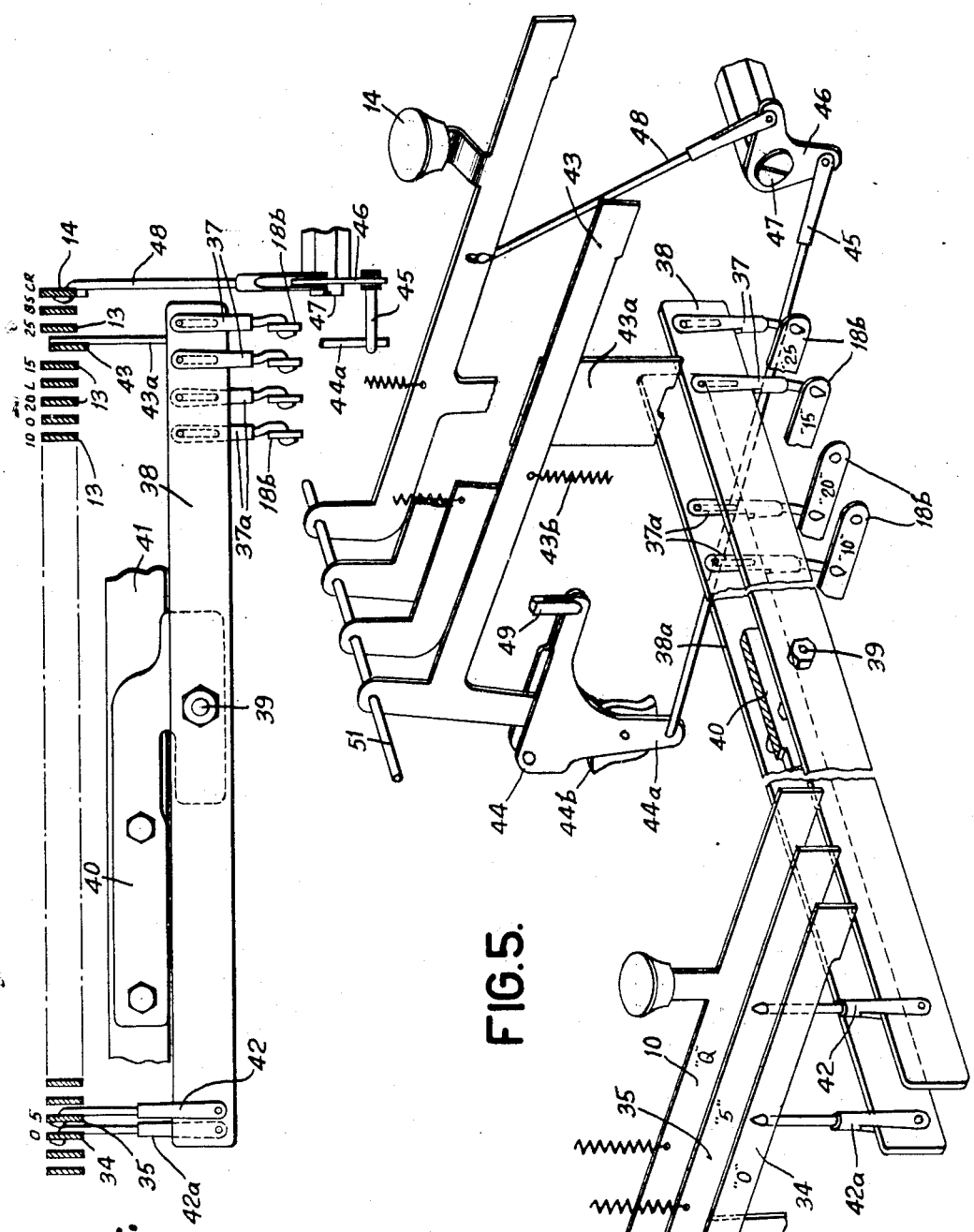
Fig. 4 is a vertical section on the line 4—4 in Fig. 1.
Fig. 5 is a perspective view of the keyboard and mechanisms under the keyboard.

Provision is made for saving a further key operation by causing an automatic return of the carriage through an automatic depression of the carriage return key whenever one of the keys 13 is depressed. The mechanism for accomplishing this result includes a key lever 43 which controls a double lobe cam unit 44 (Fig. 5). This cam unit has a downwardly projecting extension 44a (see Figs. 1 and 2 also) connected by a link 45 to a bellcrank 46 pivoted at 47 on a suitable projection on the main frame. The bellcrank 46 is connected by link 48 to the lever of the carriage return key 14, whereby the operation of the cam unit 44 in response to a depression of the special key lever 43 causes the carriage return key 14 to be depressed.

In order to restore the cam unit 44 and parts connected thereto such cam unit is connected by link 49 (Figs. 1 and 2) to a lever 50 which is pivoted on the rod 51 which also pivots the key lever for all the keys of the keyboard. This lever 50 is provided with a resilient stop bumper 52 mounted in a cup attached to the lever 50 which bumper abuts the underside of the key lever bearing support 53 carrying the rod 51. Normally the bumper 52 is held in engagement with the support 53 by a spring 54.

The key lever 43 is provided with a plate 43a (Figs. 2 to 5) which is wide enough to ride upon the right hand ends (Figs. 3, 4, and 5) of both levers 38, 38a. Normally the lever 43 is held down by a spring 43b instead of being held up by a spring. However, the holding of the key lever 43 in depressed position does not release the cam unit 44 for operation. This is due to the well known fact that, in case any key is held depressed in this machine, the operative cam is not permitted to turn continuously after completing its cycle, owing to the provision of the usual non-repeat lug on the release lever for the cam which stops the cam after it has completed its operation. The non-repeat lug holds the cam in this position until the key is released whereupon the cam turns a slight additional distance and is again stopped by the second lug on the release lever. The second lug will hold the cam against further rotation but, upon a second depression of the key, permits the cam to turn another cycle. Thus, the holding of the key lever 43 in the depressed position results in holding the cam associated with this key lever in a position to permit the cam to rotate a slight additional extent upon the raising of the key lever, but does not permit the cam to rotate sufficiently to operate the lever of the carriage return key 14.

Whenever either of the levers 38, 38a is caused to be rocked as a consequence of the depression of one of the keys 13, the plate 43a is pushed upwardly thereby raising the key lever 43 which only has the effect of permitting the cam 44b of the cam unit 44 to rotate the small amount mentioned above. However, in effect this conditions the cam unit 44 for nearly a full cycle of operation when the key lever 43 is again depressed. Upon the restoring of the cam unit 18 associated with any depressed amount key 13, the key lever 43 is permitted to drop. This action takes place while the first of the two operated typebars is restoring with the result that about the time the second typebar starts its stroke, the double lobe cam unit 44 is released and operates to depress key 14 practically synchronously with the last half cycle of the cam unit 36a of the cam unit 36 which is operative to print the second of the two digits.

The carriage return key 14 controls a single lobe cam unit which operates a toggle mechanism controlling the carriage return clutch to cause the carriage return mechanism to be operative to return the carriage. The carriage return may be of the form disclosed in Patent No. 1,753,450. Since the cam unit controlled by the key 44 is not actually released until the key is almost fully depressed, a further time lag is obtained which allows time for the second of the two typebars to get clear of the work sheet before the carriage actually starts to return. It will thus be seen that depression of any one of the amount keys 13 causes two digits to be printed by successive operation of two typebars and an automatic return of the carriage.

It will be noted, with reference to Fig. 6, that most of the items are 10, 15, 20, and 25 cents and the printing of these items is always followed by a carriage return operation. In the case of the seventh item, there is a toll call which calls for a ten cent tax item in the last column which is to be followed by a carriage return operation. With the exception of the item on the fourth line, it is possible to effect the printing of all or a part of the items by means of one of the amount keys 13 and return the carriage automatically. The fourth item must be written and the carriage returned by separate operations of the numeral keys 11 and key 14, but the seventh item requires separate operations of keys 11 only in writing 50 cents in the amount column, the tax being printed by means of the 10 cent key 13 and the carriage returns automatically. In billing operations of this type, the greater part of the items are in the amounts of 10, 15, 20, and 25 cents and there will only occasionally occur items which must be written by separate numeral key operations and a separate depression of a carriage return key. Even in such cases, a large amount would involve tax items which may be printed by means of keys 13. It will thus be seen that a considerable saving of time and labor is effected by the use of keys 13 and the billing operation may be accomplished more rapidly and with less fatigue than would be possible with separate key operations. Such itemized bills as are illustrated in Fig. 9 are very common and where used are written in very large numbers. In the case of the telephone business, the aggregate of all the items on the bill or statement is usually very low and the cost of writing the bill represents a major item of overhead expense which must be kept as low as possible. While a statement used by telephone companies has been shown for purposes of illustration, it will be understood that the invention may be applied to writing other bills and statements.

As a means of illustrating the basic operating principle, the invention has been described with reference to the printing of small amounts. It is adaptable to other uses, however, such as the writing of code symbols, and abbreviations, particularly in tabulations where space is often limited. This merely requires changing the types on the typebars and the key caps or, perhaps, connecting the links 42, 42a (Fig. 5) to the keys for alphabetic typebars.

While there has been shown and described and pointed out the fundamental novel features of the invention as applied to a single embodiment it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described, the combination of a keyboard including key levers representing amounts consisting of a plurality of digits and also including key levers representing single digits of the amounts represented by the first key levers; a series of type bars, each for printing one of the digits involved in the multi-digit amounts; power operating means for the type-bars including a continually rotating power roller and a series of cam units rendered operative by the key levers, each typebar being operated by one of said units, each multi-digit key lever controlling one of said units to cause a typebar to be operated which corresponds to one of the digits of the multi-digit amount represented by such key lever; and means operated by the cam units for the multi-digit key levers for drawing down the key lever of the cam unit associated with the remaining digit of the multi-digit amount whereby the operation of a single key lever representing a multi-digit amount causes two operations of the power means to operate both the typebar for one digit of the amount and the typebar representing another digit of the amount.

2. In a machine of the class described, a continually rotating power roller, a series of cam units operatively engageable with the power roller to be operated thereby; a series of numeral type bars, each for printing a single digit, each typebar being operable by a cam unit; a keyboard including key levers corresponding to said cam units and type bars and, when operated, causing the associated cam units and typebars to be operated by the power roller, certain of said key levers representing multi-digit amounts and the corresponding typebar printing only one of the digits of said amounts, others of said key levers representing the remaining digits of said amounts; and connections between the key levers representing the remaining digits and the cam units for the key levers representing multi-digit amounts for causing the key levers representing the remaining digits to be operated by the cam units associated with the key levers representing the multi-digit amounts whenever a key lever representing a multi-digit amount is depressed.

3. In a typewriting machine, a keyboard including key levers representing multi-digit amounts and key levers representing certain of the digits occurring in the amounts represented by the first key levers; typebars corresponding to said key levers, certain of the typebars corresponding to the multi-digit key levers and printing one of the digits which are represented by the multi-digit key levers, others of the type bars corresponding to the remaining key levers and printing the remaining digits; a power roller; cam units operable by the rotation of said power roller and individually connected to said typebars, said multi-digit key levers controlling cam units which operate typebars printing a first digit of the multi-digit amounts; and levers operated by the cam units associated with the multi-digit key levers for actuating the key levers corresponding to the remaining digits of the multi-digit amounts whereby the depression of a key lever representing a multi-digit amount causes the cam unit associated with such key lever to operate the typebar printing the first digit and also causes depression of the key lever corresponding to the type bar which prints the remaining digit.

4. In a machine of the class described, a keyboard including a group of key levers, each of which represents a different multi-digit amount, certain of the amounts represented by the key levers having common second digits, said keyboard also including key levers corresponding to the common second digits; a series of typebars including type bars for the common second digits and typebars for the first digits, said typebars for the first digits corresponding to the multi-digit key levers; power operating means for the typebars including a power roller and cam units operable thereby and associated one with each of said key levers, said cam units being rendered operable by the power roller when the corresponding key lever is operated; and means connecting all of the cam units associated with all of the multi-digit key levers representing amounts having a common second digit to the key lever for the second digit, whereby the operation of any cam unit corresponding to a multi-digit key lever to print the first digit of the multi-digit amount represented by such key lever also actuates the key lever for one of the common second digit cam units to render the latter cam unit operable by the power roller to print the second digit of the multi-digit amount represented by the operated multi-digit key lever.

5. In a machine of the class described, the combination of a keyboard having keys and key levers representing multi-digit amounts and also representing first digits of said amounts only, certain of said multi-digit amounts having common second digits, said keyboard also having keys and key levers representing said common second digits whereby the keyboard contains key levers which represent every digit which occurs in all of the multi-digit amounts; a series of typebars, one for each digit which may appear in any of the multi-digit amounts, the typebars for the second digits being associated with the key levers for the second digits and the typebars for the first digits being associated with key levers for the multi-digit amounts; power means for operating said type bars including type bar actuating elements individual to said keys and to said typebars and individually controlled by said keys, each key when actuated rendering the corresponding one of said elements operative to actuate the typebar associated therewith; and means directly operable by all of the elements corresponding to the keys representing amounts having a common second digit for actuating the key lever corresponding to the type bar which prints the common second digit whereby depression of a multi-digit key causes its associated element not only to actuate a typebar representing a first digit of the amount but also actuate the key lever corresponding to the common second digit.

6. In a machine of the class described, a keyboard including a key lever representing a multi-digit amount and a key lever representing one of the digits in said amount, said first key lever also representing the remaining digit of the amount; a pair of typebars for printing said digits; a pair of power typebar operating devices, each controlled by one of said key levers for operating the associated typebar; and a member connecting the power device corresponding to the multi-digit key lever to the second key lever for operating the second key lever whenever the type bar for printing the first digit of the multi-digit amount is actuated whereby to cause the second digit of the amount to be automatically printed.

7. In a machine of the class described, a keyboard including a key lever representing a multi-digit amount and a key lever representing one of the digits in said amount, said first key lever also representing the remaining digit of the amount; a pair of typebars for printing said digits, a pair of power operating devices, each directly controlled by one of said key levers, for operating the associated typebar; a member connecting the power device corresponding to the multi-digit key lever to the second key lever for operating the second key lever whenever the typebar for printing the first digit of the multi-digit amount is actuated whereby to cause the second digit of the amount to be automatically printed, a carriage return initiating member, and means controlled by the first member for operating the second member when a multi-digit key lever is depressed.

8. In a machine of the class described, a pair of typebars, each for printing one of two characters of a combination of characters; power devices individual to said typebars for separately operating the typebars; controlling members for said power devices, one controlling member representing the character combination and controlling the operation of one of the power devices to print a first character, and the other member controlling the other power device to print the other character of the combination, and a connecting member operable by the first power device and connected to the controlling member for the second power device to cause an operation of the second device each time the first power device operates the typebar for printing the first character.

9. In a typewriting machine, a series of typebars for printing the digits of amounts one digit at a time; a series of keys, each representing a different amount comprising a plurality of digits; means to operate the typebars one at a time, means controlled by the keys for causing said operating means to operate a plurality of the typebars in succession to print the respective digits represented by the keys, carriage return means, and means rendered effective by the key controlled means for causing an operation of the carriage return means.

10. In a typewriting machine, a series of typebars, each representing a single digit, and operable successively to print an amount comprising a plurality of digits; separate power means to operate each typebar, selectively operable devices representing amounts for directly causing operation of the power means for certain of the typebars to print the first digit of the amount represented by a selected device, means controlled by the power means for the selected device for causing the power means for another typebar to actuate the latter to print another digit of the amount represented by the selected device, carriage return means, and means controlled by the power means for the selected device for initiating an operation of the carriage return means.

11. In a typewriting machine, means to separately print single digits of amounts comprising a plurality of digits; power operating devices for the printing means, each device representing a single digit; a series of keys representing multidigit amounts for controlling certain of the power devices, each key causing one of said devices to operate to cause a first digit to be printed; means operated by each device associated with a multi-digit key for causing a second device to operate to print a succeeding digit, carriage return means, and means operated by the power devices for the keys representing multidigit amounts for initiating an operation of the carriage return means.

12. In a typewriting machine, means to print any one of several digits separately, power operating mechanism for the printing means, a series of amount keys representing amounts comprising a plurality of digits, said amount keys causing an initial operation of the power operating mechanism to print one digit of the amount represented by a selected key, means operated by the power operating mechanism to cause another operation of the power operating mechanism to print another digit of the amount represented by the selected key, carriage return means, and means operated by the power operating mechanism for initiating an operation of the carriage return means.

13. In a typewriting machine, a group of character type bars; a series of keys representing combinations of characters, each key being associated with a type bar printing one of the characters of the combination represented by said key; a group of power operating devices, each controlled by one of said keys and operating the corresponding type bar; a second group of type bars for printing the remaining characters of the combinations, a second group of power operating devices for operating the type bars printing the remaining characters, key levers for controlling the power operating devices of the second group, means operated by the power operating device for a selected combination character key for causing the power operating device of the second group corresponding to the remaining character to be operative to actuate the type bar of the second group corresponding to the remaining character of the combination represented by the selected combination character key, carriage return initiating means, and means to initiate an operation of the carriage return initiating means each time a combination character key is operated.

14. In a typewriting machine, mechanism to print a plurality of different characters one at a time; a series of selectively operable elements each representing at least one character, certain of said elements representing a combination of characters and also one of the characters of the combination represented, others representing the remaining characters comprised in said combinations, said elements controlling the printing of said characters by the printing mechanism; means rendered operative by the actuation of a selected combination character element for causing operation of the element controlling the printing of the remaining character of the combination represented by the combination character element, carriage return initiating means, and means controlled by the first named means for causing an operation of the carriage return initiating means.

15. In a typewriting machine, a keyboard including a series of combination character keys, each representing both a combination of characters and one of the characters of the combination, single character keys representing certain of the remaining characters appearing in the combinations of characters, and a carriage return key; and means controlled by the combination character keys for causing operation of the single character keys and the carriage return key successively and combinationally.

16. In a machine of the class described, a keyboard comprising a plurality of multiple character key levers, each key lever also representing a single character, and including key levers representing certain of the remaining characters of the first key levers; printing mechanism for printing the characters one at a time; power operated means for actuating the printing mechanism including power actuated elements selectively controlled by said key levers and operatively connected to the printing mechanism, each power actuated element representing a different character; and means extending underneath the keyboard between the power actuated elements associated with the multiple character key levers and the second named key levers for actuating said second named key levers each time an element associated with one of the multiple character key levers is rendered operative by depression of its associated key lever.

17. In a typewriting machine, mechanism for printing characters one at a time, selectively operable elements for controlling said mechanism, certain of which represent and cause the printing of single characters and others of which represent and cause printing of different combinations of characters including the characters represented by said certain elements, and including an element for initiating a carriage return operation, and means controlled by the combination character elements for causing operation of one of the single character elements and the carriage return initiating element, whereby to print a combination of characters and effect a return of the carriage as a result of operation of any combination character element.

18. In a machine of the class described, a keyboard comprising a plurality of keys, each representing a plurality of characters and also representing a particular one of said plurality of characters, a plurality of keys representing the remaining characters of the plural character keys and a carriage return initiating key; mechanism for printing all of said characters one at a time; power mechanism for operating the printing mechanism including a series of power actuated elements, each corresponding to a key and actuated under control of such key whenever the key is operated; and means mechanically connecting the power actuated elements corresponding to each multiple character key to the single character and carriage return keys to effect an operation of at least one of the single character keys and also the carriage return key whenever a multiple character key is operated.

19. In a machine of the class described, a keyboard including keys having key caps bearing multiple characters and additional keys representing certain of the characters appearing on the caps of the multiple character keys, printing mechanism operable to print, one at a time, any of the characters represented by said keys; power mechanism for operating the printing mechanism including power actuated elements, each corresponding to and controlled by a key; and members connecting the power actuated elements for the multiple character keys to the single character keys.

20. In a machine of the class described, the combination of a series of selectively operable elements, certain of which elements represent multiple characters and also one of the multiple characters, others of which elements represent the remaining single characters of the multiple characters; printing mechanism operable to print, one at a time, any of the characters; power mechanism for operating the printing mechanism including power actuated elements, each corresponding to a selectively operable element, said multiple character elements when operated causing the associated power actuated elements to operate the printing mechanism to print one of the multiple characters; and means mechanically coupling the power actuated elements for the multiple character elements to the selectively operable elements representing single characters to actuate the single character elements selectively whereby to effect the printing of the remaining character represented by a multiple character element.

21. In a machine of the class described, a series of keys, certain of which represent combinations of characters and each also individually representing one of the characters, others of which keys individually represent the remaining characters of the combination keys whereby the keyboard includes at least one combination character key representing one of the characters of a combination and a second key representing another character of the combination, certain of the characters included in some of the combinations of characters being repeated in or common to other combinations, said keyboard having a single key for each common or repeated character; power operated printing mechanism for printing the characters one at a time, and including power actuated elements, each power actuated element corresponding to one of the keys and operated when the corresponding key is actuated; and means connecting each of the repeated character keys to all of the elements corresponding to the combination character keys having the repeated character, said connecting means being operated by said power actuated elements whenever a combination character key is operated and arranged so that all of the power actuated elements corresponding to keys which have a common character operate the key corresponding to that character.

22. In a machine of the class described, a keyboard comprising combination character keys, each combination character key also representing one of the characters of the combination corresponding thereto, said keyboard also including keys representing the remaining characters; a series of type bars each corresponding to one of said keys and printing the character represented by such key, there being present at least two typebars for each combination character key for separately printing the characters of each combination; power mechanism for operating the typebars including power actuated elements, each connected to and operating one of the typebars; and elements connecting the power actuated elements to certain of said single character keys whereby at least one of the single character keys is operated each time one of the power actuated elements associated with an operated combination character key actuates its typebar.

23. In a machine of the class described, a keyboard comprising combination character keys, each combination character key also representing one of the characters of the combination corresponding thereto, said keyboard also including keys representing the remaining characters; a series of printing members, each corresponding to one of said keys and printing the character represented by such key, power mechanism for operating the printing members including power actuated elements, each connected to a printing member and operated therewith; elements connecting the first named elements to certain of said single character keys whereby at least one of the single character keys is operated each time one of the first named elements associated with an operated combination character key is actuated, carriage return initiating means, and means operated by the connecting elements for effecting an operation of the carriage return initiating means.

24. In a machine of the class described, a keyboard comprising combination character keys, each representing a different combination of characters, each combination character key also representing one of the characters of its combination, said keyboard also including keys representing the remaining characters of the several combinations; a series of typebars, each corresponding to one of said keys and printing the character represented by such key; power mechanism for operating the typebars including power actuated elements, certain of which are individually connected to and operate the associated typebars, elements actuated by the first named elements and connected to certain of said single character keys whereby at least one of the single character keys is operated each time one of the first named elements associated with an operated combination character key is actuated, a carriage return initiating device, and means controlled by the last named elements and operated by one of the power actuated elements for operating the carriage return initiating device.

25. In a machine of the class described, a keyboard comprising a plurality of keys representing combinations of characters, each of said keys also representing one of the characters in the combination, and also comprising other keys representing the remaining characters of the combinations, printing mechanism for printing any of said characters one at a time, a carriage return initiating device, power mechanism including a series of power actuated elements, certain of said power actuated elements corresponding to and controlled by said keys and operating the printing mechanism, and means mechanically connecting the power actuated elements for the combination keys to the single character keys whereby an operation of a combination character key causes printing of one of the characters of the combination and, through the power actuated element corresponding to the operated combination character key, causes the printing of the second character of the combination by depression of a single character key, said means also controlling one of said power actuated elements to cause the carriage return initiating device to be operated.

26. In a machine of the class described, a keyboard including a carriage return key, a plurality of character printing keys, each of which represents a combination of characters and also represents one of the characters of a combination, and a series of keys representing the remaining characters of the combination; mechanism for printing said characters; power operating mechanism including a series of power actuated elements for operating the printing mechanism, said elements corresponding to and controlled by said keys, and including a power actuated element corresponding to the carriage return key; connections between the power actuated elements for the combination character keys and the keys representing single characters for selectively operating said single character keys when a combination character key is operated, and means controlled by said connections for controlling the power actuated means for the carriage return key whereby the depression of any combination character key first effects printing of one character of the combination and then effects both the printing of the other character and the initiation of a carriage return operation.

27. In a machine of the class described, the combination of a keyboard having a series of related key levers and a series of related typebars, each type bar corresponding to a key lever; power operating devices corresponding to said key levers for operating the associated typebars; and means connecting all the power devices for a group of related key levers to another related key lever whereby the operation of one related key lever to cause an operation of the associated typebar also, through the associated power device, causes an operation of another related key lever and thereby further causes operation of the power device and typebar associated with the last named related key lever.

28. In a machine of the class described, a keyboard including a series of related key levers, a series of power devices controlled by said key levers, and connections between a plurality of the power devices corresponding to a plurality of related key levers and another related key lever for causing the last named key lever to be operated whenever one of said plurality of power devices is operated whereby to cause an operation of a second power device in consequence of the operation of said one of the plurality of power devices.

29. In a machine of the class described, a keyboard including at least three related key levers; power devices, each associated with and rendered operative by one of said key levers, mechanisms respectively operated by said power devices when the corresponding key levers are actuated, and means operatively coupling two of said key levers to the power device for the third key lever for causing three of said power devices to operate in consequence of actuation of the third key lever.

30. In a machine of the class described, a plurality of related typebars, each for printing a different character of a combination of characters; a rotatable power roller; a pair of cam units for operating said typebars, said cam units having cams engageable with and rotatable by the power roller, one of said cams being shaped to operate the associated typebar at a different relative time than the other, whereby, if simultaneous operation of both cams by the power roller occurred, one typebar would be operated later than the other; a combination character key for operatively connecting the cam of the faster cam unit to the power roller; a member for operatively connecting the cam of the slower cam unit to said roller, and means controlled by the faster cam unit for actuating said member.

RICHARD W. DAVIDSON.